ated Aug. 23, 1977

United States Patent [19]
Wilson

[11] 4,044,261
[45] Aug. 23, 1977

[54] METHOD AND SYSTEM FOR IMPROVING THE DEFINITION OF A SCINTILLATION DETECTOR

[75] Inventor: James B. Wilson, Arlington, Va.

[73] Assignee: Georgetown University, Washington, D.C.

[21] Appl. No.: 667,631

[22] Filed: Mar. 17, 1976

[51] Int. Cl.² ............................................. G01T 1/20
[52] U.S. Cl. ............................ 250/369; 250/363 S; 328/167; 333/70 CR
[58] Field of Search ............ 328/167; 333/19, 70 CR; 250/363 S, 369, 363

[56] References Cited

U.S. PATENT DOCUMENTS

| | | | |
|---|---|---|---|
| 2,450,818 | 10/1948 | Vermillion | 328/167 |
| 3,102,954 | 9/1963 | Richardson et al. | 250/369 |
| 3,153,207 | 10/1964 | Brown | 333/19 |
| 3,525,047 | 8/1970 | Schwartz | 328/117 |
| 3,842,278 | 10/1974 | Noakes | 250/369 |
| 3,942,011 | 3/1976 | Stout | 250/363 S |

*Primary Examiner*—Harold A. Dixon
*Attorney, Agent, or Firm*—Connolly and Hutz

[57] ABSTRACT

The definition of a tomographic readout image is highly sharpened and improved by minimizing or eliminating the effects of persisting images in the electronic scintillating circuit resulting from phosphorescent afterglow, by utilizing a special filter network in the detecting circuit.

8 Claims, 4 Drawing Figures

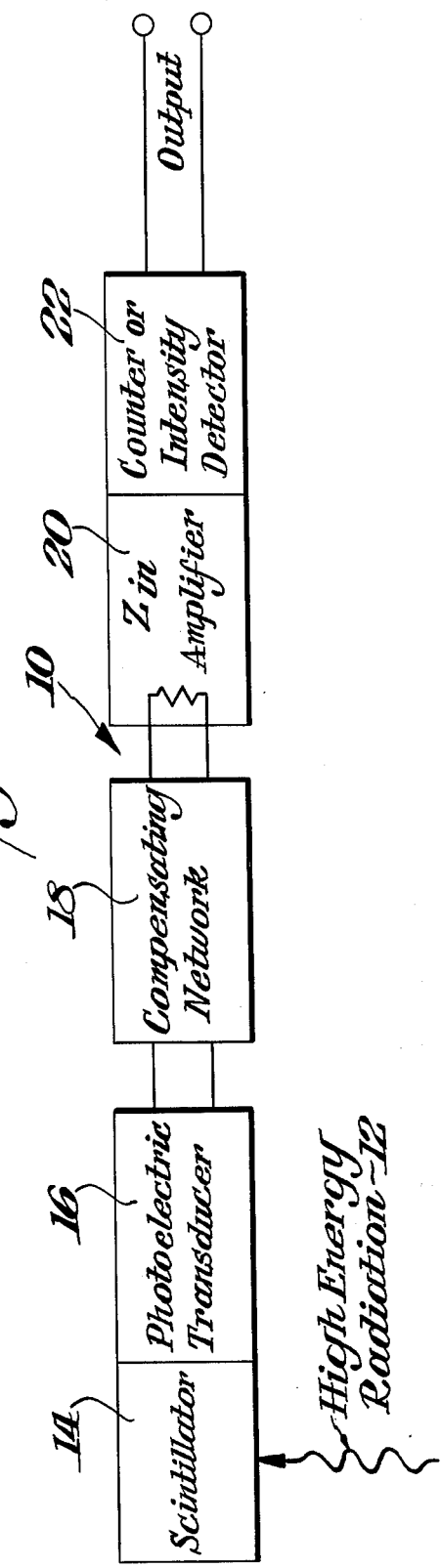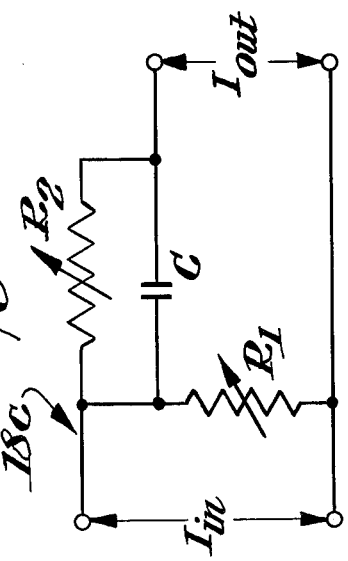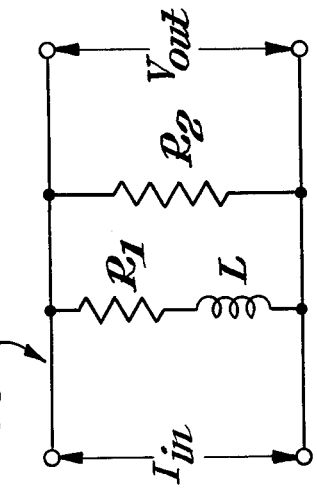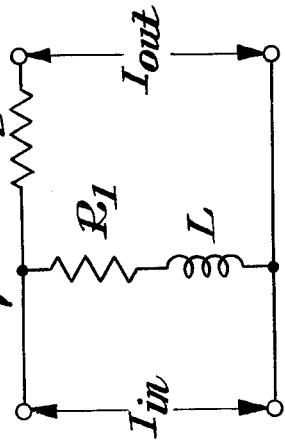

METHOD AND SYSTEM FOR IMPROVING THE DEFINITION OF A SCINTILLATION DETECTOR

BACKGROUND OF THE INVENTION

Tomographic images obtained by scanning bodies with high energy radiation and detecting absorption by a scintillating crystal detector have not been completely sharp and clear, especially at the edges or boundaries. Heretofore, attempts have been made to improve image definition, especially at the boundaries, by surrounding the scanning body by a bag of water or employing a shutter to cut off the radiation when the scanning beam leaves the edge of the body being scanned. It was known that a portion of the incident radiation on a scintillation detector is converted into phosphorescent radiation of approximately the same wavelength as the flourescent radiation and this might be problematical. For a telluriumdoped sodium iodide scintillation crystal, 91 percent of the absorbed radiation is converted into fluorescent radiation and 9 percent is converted into phosphorescent radiation. (S. Koički, A. Koički and V. Ajdačić "The Investigation of the 0.15 s. Phosphorescent Component of NaI(TI) and Its Application in Scintillation Counting, " *Nuclear Instruments and Methods*, 108: 198-9 (1973)). The production of phosphorescent radiation interferes with the measurement of the intensity of the high-energy radiation. According to the Koički et al. article, the fluorescent decay time for a tellurium-doped sodium iodide crystal of 225 nanoseconds compares to a phosphorescent decay time of 150 milliseconds. When photons strike the detector with relatively high frequency, the phosphorescence produced by photons prior in time will persist and interfere with the detection and resolution of the more-or-less instantaneous flourescent events.

When the flourescent and phosphorescent radiation are of about the same frequency and wavelength, a photomultiplier tube (PMT) positioned to detect the lower-energy radiation produced by the scintillator cannot readily distinguish the flourescent event from the phosphorescent event. The electrical output signal of the PMT is, therefore, the summation of the flourescence produced by the immediate photons and the phosphorescence produced by the prior photons.

It was, however, not therefore understood or appreciated that phosphorescent afterglow is the primary cause of poor image definition of tomographic images, especially at the boundaries. An object of this invention is, therefore, to provide a simple and economical means for improving the definition of a scintillation detector, and, more particularly, for sharpening the definition of tomographic images obtained from tomographic scanning and scintillating counter detection.

SUMMARY

In accordance with this invention, the image outline obtained from tomographic scintillation detection is improved, to the extent that water bags or shutters can be eliminated. This is accomplished by utilizing a special network in the detecting circuit, which eliminates or minimizes the part of the scintillation signal attributable to phosphorescent afterglow. The purpose of the special network is to cancel out the portion of the scintillator signal resulting from phosphorescent decay. An effective method employs a variable resistor $R_1$ connected directly across the input source and in parallel with it. Parallel-connected variable resistor $R_2$ and capacitor C are connected in series with the input source. The variable resistors are adjusted until the image sharpens to the maximum. The resistors are relatively small with respect to the capacitor, which is as large as possible (such as 10 microfarads). The capacitor is a nonelectrolytic type having a low dissipation factor or low loss factor. Resistor $R_1$ is much larger than resistor $R_2$ which is in parallel with the capacitor. The size of the resistors depends upon the phosphorescent characteristics of the scintillating crystal. A ratio of about 10 to 1 is suitable for a NaI crystal and about 100 to 1 for a $C_aF$ crystal. Approximate relative sizes can be roughly predicted by mathematical analysis based on transfer functions.

BRIEF DESCRIPTION OF THE DRAWINGS

Novel features and advantages of the present invention will become apparent to one skilled in the art from a reading of the following detailed description in conjunction with the accompanying drawings wherein similar reference characters refer to similar parts and in which:

FIG. 1 is a schematic block diagram of a scintillation crystal detecting device employing one embodiment of this invention; and FIGS. 2a, 2b, and 2c are special networks which can be used as part of the detecting device shown in FIG. 1.

DESCRIPTION OF THE PREFERRED EMBODIMENTS

In FIG. 1 numeral 10 designates the scintillation detector. High-energy radiation 12 impinges on the scintillation crystal 14 where it produces a light flash detected by the photoelectric transducer 16 which is photomultiplier tube 16 (PMT). The PMT output signal is passed through compensating network 18 comprising an afterglow compensation circuit. The output signal, altered by circuit 18 to compensate for detected scintillator phosphorescence, is passed to low impedance amplifier 20 which amplifies the signal to a level detectable by a counter or intensity detector 22.

FIGS. 2a, 2b and 2c illustrate three simple networks for circuit 18 having transfer functions which can be approximated by utilizing the following mathematical computations and equations. The afterglow effect can be mathematically described in the following manner. The conversion efficiency for most scintillators is about 100 percent. However, due to losses in the optics and the detector response, the energy actually detected is only a fraction of the incident energy. For practical purposes, the detected energy is a constant proportion of the incident energy. Representing the time function of a high-energy incident radiation beam as $w_{in}(T)$, the detectable energy $w_{det}(T)$ is a constant fraction $k$ of the incident radiation or, $w_{det}(T) = kw_{in}(T)$. Of the detectable energy, a constant fraction g is converted into flourescent energy $w_{fl}(T)$ and the remainder 1-g is converted into phosphorescent energy $w_{ph}(T)$. Therefore, for each incident photon $w_{det}(T)=w_{fl}(T)+w_{ph}(T)$ with $w_{fl}(T)=gw_{det}(T)$ and $w_{ph}(T)=(1-g)w_{det}(T)$.

Because the phosphorescent decay time is relatively large with respect to the flourescent decay time, phosphorescent energy is effectively stored in the scintillator as potential energy, $w_{st}(T)$. The potential energy stored in the detector is incremented by an amount of energy $w_{ph}(T)$ for each absorbed photon and is continuously diminished by the release of phosphorescent energy at a rate proportional to the magnitude of stored phosphorescent energy. Therefore, the increase of potential energy with respect to time is represented by the following differential equation:

EQUATION 1

$$\frac{d}{dT} w_{st}(T) = \frac{d}{dT} w_{ph}(T) - \frac{w_{st}(T)}{u} =$$

$$(1-g)\frac{d}{dT} w_{det}(T) - \frac{w_{st}(T)}{u}$$

where $u$ is a time constant. Representing power $p$ as $dw/dT$, then from Equation 1:

EQUATION 2

$$\frac{dw_{st}(T)}{dT} = (1-g)P_{det}(T) - \frac{w_{st}(T)}{u}$$

The power released by the scintillator at a point in time, $P_{out}$, is necessarily the sum of the fluorescent power $p_{fl}$ and the stored phosphorescent power simultaneously emitted. Hence, the scintillator power $P_{out}(T)$ can be represented as:

EQUATION 3

$$P_{out} = P_{fl}(T) + \frac{w_{st}(T)}{u} = g P_{det}(T) + \frac{w_{st}(T)}{u}$$

Taking a Laplace transformation of Equation 2 and Equation 3, where the Laplace transformation is defined by:

EQUATION 4

$$F(s) = \int_0^\infty f(T)e^{-sT}dT$$

Yields:

EQUATION 5

$$sW_{st}(s) = (1-g)P_{det}(s) - \frac{W_{st}(s)}{u}$$

EQUATION 6

$$P_{out}(s) = gP_{det}(s) - \frac{W_{st}(s)}{u}$$

Combining these two Laplace transformation equations, Equation 5 and Equation 6, produces a transfer function for the released power with respect to the detectable power:

EQUATION 7

$$\frac{P_{out}}{P_{det}} = g \frac{s + 1/gu}{s + 1/u}$$

Thus, the effect of the persisting phosphorescent can be compensated for by incorporating a network in the detector circuitry which has a transfer function whose complex part, involving $s$, is the reciprocal of the complex part of the derived Equation 7, or $$\frac{s + 1/u}{s + 1/gu}$$

Referring now to the circuit illustrated in FIG. 2a, where $R_1$ and $R_2$ are resistors and L is an inductor, the current/current transfer function is:

$$\frac{I_{out}}{I_{in}} = \frac{s + R_1/L}{s + (R_1 + R_2)/L}$$

If the circuit elements are chosen such that $L/R_1 = u$ and $R_2 = R_1 \cdot (1-g)/g$, then the transfer function becomes:

$$\frac{I_{out}}{I_{in}} = \frac{s + 1/u}{s + 1/(gu)}$$

The voltage/current transfer function of the circuit illustrated in FIG. 2b is:

$$\frac{V_{out}}{I_{in}} = R_2 \frac{s + R_1/L}{s + (R_1 + R_2)/L}$$

with elements chosen as above for FIG. 2a, the transfer function becomes:

$$\frac{V_{out}}{I_{in}} = R_2 \frac{s + 1/u}{s + 1/(gu)}$$

The current/current transfer function of the circuit shown in FIG. 2c is:

$$\frac{I_{out}}{I_{in}} = \frac{s + 1/(R_2C)}{s + 1/(R_1C) + 1/(R_2C)}$$

where $R_1$ and $R_2$ are resistors and C is a capacitor. If the circuit elements are chosen such that $R_2C = u$ and $R_1 = R_2 \cdot g/(1-g)$, then the transfer function becomes $$\frac{I_{out}}{I_{in}} = \frac{s + 1/u}{s + 1/(gu)}$$

It should be noted that, if the parameters $u$ and $g$ are not known exactly, then the circuit elements of FIG. 2 can be made variable and adjusted to optimum values with the detector in operation.

For a NaI scintillation crystal, the values for the preferred network of FIG. 2c are as follows. Capacitor C is 10 microfarads and is constituted by a nonelectrolytic capacitor, such as a Mylar capacitor having a low dissipation in loss factor, such as, for example, 0.1%.

Mylar is a trademark for a polyester film made and sold by E.I. duPont DeNemours & Co., Wilmington, Delaware. It is a highly durable, transparent, water-repellent film of polyethylene terephthalate resin, characterized by outstanding strength, electrical properties, and chemical inertness, and may be used from 60° to 150° C. because of its inherent thermal stability. Available in thicknesses from 0.0025 inches to 0.0075, inches and in several types for specific applications. Uses: Primarily as electrical insulation for capacitors, motors, generators and transformers, and as a barrier tape for wire and cable; may also be used for many non-electrical applications such as decorative laminations, vapor-barrier materials, as printed cover for acoustical tile, and various types of industrial tapes and magnetic recording tapes.

$R_1$ resolves by computation and empirical testing to have a value between about $50_k$ and $250_k$, $R_2$ resolves to a resistor ranging from about $5_k$ and $15_k$. The mathematical computations only provide a starting point for resolving the network for cancelling the phosphorescent afterglow. The operative values are only obtained by empirically varying the resistors to obtain the best and sharpest image.

I claim:

1. A system for improving the definition of a scintillation detector comprising a network connected to the detector, the network being constructed and arranged to minimize the effect of a phosphorescent afterglow in the detector, the network has an input and comprises a pair of variable resistors and a capacitor, one of the variable resistors being connected directly across and in parallel with the input, the other variable resistor being connected in parallel with the capacitor, the parallel-connected variable resistor and capacitor being connected in series with the input, and the capacitor having a relatively large capacitance and a low dissipation factor.

2. A system as set forth in claim 1 wherein the capacitor has a capacitance of about ten microfarads and a dissipation factor of about 0.1%.

3. A system as set forth in claim 2 wherein the capacitor is a nonelectrolytic capacitor.

4. A system as set forth in claim 1 wherein the first-mentioned variable resistor has a much greater resistance than the other variable resistor, which is in parallel with the capacitor.

5. A system as set forth in claim 4 wherein the scintillation detector incorporates a NaI crystal, and the first-mentioned variable resistor has about ten times the resistance of the other variable resistor.

6. A system as set forth in claim 4 wherein the scintillation detector incorporates a CaF crystal and the first-mentioned variable resistor has about one hundred times the resistance of the other variable resistor.

7. A system for improving the definition of a tomographic scintillation detector comprising the network set forth in claim 1, wherein the scintillation detector incorporates a NaI crystal, and the first-mentioned variable resistor has about ten times the resistance of the other variable resistor.

8. A system for improving the definition of a tomographic scintillation detector comprising the network set forth in claim 1, wherein the scintillation detector incorporates a CaF crystal, and the first-mentioned variable resistor has about one hundred times the resistance of the other variable resistor.

* * * * *